United States Patent

[11] 3,588,222

| [72] | Inventor | Harold A. Julius<br>101, Summerset Hall, Central Ave., Illovo, South Africa |
|---|---|---|
| [21] | Appl. No. | 772,658 |
| [22] | Filed | Nov. 1, 1968 |
| [45] | Patented | June 28, 1971 |
| [32] | Priority | Nov. 9, 1967 |
| [33] | | South Africa |
| [31] | | 67/6721 |

[54] ROAD REFLECTORS
3 Claims, 3 Drawing Figs.

[52] U.S. Cl. .................................................. 350/100
[51] Int. Cl. ............................................ G02b 17/02
[50] Field of Search ........................................... 350/97-–109

[56] References Cited
UNITED STATES PATENTS

| 3,253,971 | 5/1966 | Garling | 350/109 |
| 2,703,038 | 3/1955 | Shaw | 94/1.5UX |
| 3,373,667 | 3/1968 | Myers | 94/1.5 |

FOREIGN PATENTS

| 1,065,622 | 4/1967 | Great Britain | 350/100 |

Primary Examiner—David Schonberg
Assistant Examiner—Michael J. Tokar
Attorney—Alfred W. Breiner ABSTRACT: A road reflector consisting of an exposed hollow elastomeric body housing one or a pair of oppositely directed cylindrical reflectors adapted to be pushed downwardly into the hollow interior of the body by pressure of a vehicle, thereby causing each reflector to be cleaned by a wiping rib forming part of the body, which latter is mounted on a rigid platelike base adapted to be directly adhesively united to a road surface.

PATENTED JUN28 1971

3,588,222

INVENTOR,
HAROLD ARTHUR JULIUS

BY Brufsky, Staas, Breiner & Halsey
ATTORNEYS

ROAD REFLECTORS

This invention relates to road reflectors of a type commonly known as "cats' eyes."

In particular the invention relates to a road reflector having a reflecting surface which is cleaned by the action of a vehicle passing over it. Known road reflectors of this type comprise part spherical reflectors mounted in a flexible elastomeric moulding which in turn is housed in a strong metal box with a portion of the moulding projecting above the surface of the box or otherwise exposed so that it may be depressed by the tires of a motor vehicle. This action causes the spherical reflectors to be wiped by downward and return movement of the spherical reflectors past an adjacent portion of the moulding.

While this wiping action is highly desirable it is generally not very effective since portions of spherical surfaces of varying diameter are required to be wiped by a portion of the moulding of constant diameter. These road reflectors have other disadvantages particularly high manufacturing cost and the requirement that the outer box portions must be largely buried below the road surface, which in turn involves high installation and replacement costs.

It is the object of the present invention to provide an inexpensive road reflector which is not readily damaged and in which the reflectors may be effectively kept clean.

In accordance with this invention there is provided a road reflector comprising a body of moulded resilient material secured to a rigid base, said body including an upwardly projecting bridge portion and an elongated recess extending into the side of the body and under the bridge portion, an outwardly directed reflecting assembly housed in the recess, said reflecting assembly including a lens member having an exposed and outwardly directed part cylindrical surface, a wiping rib projecting from the body and extending below the exposed surface of the lens member, and an aperture in the body below the reflecting assembly.

The invention is illustrated in the accompanying drawings in which.

Figure 1:
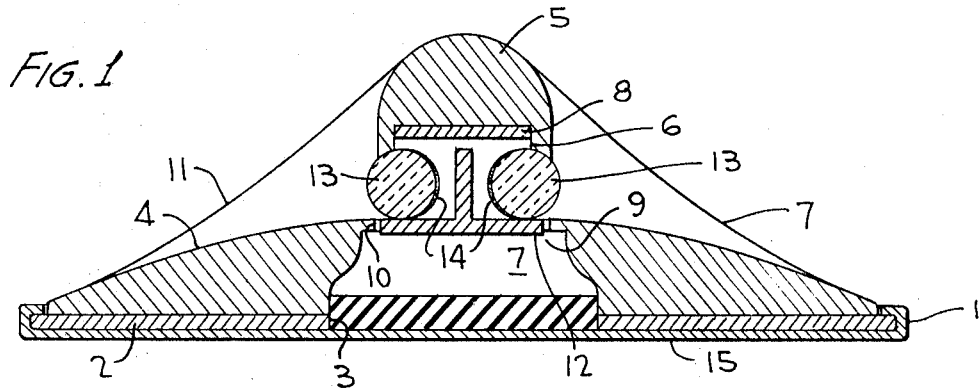
FIG. 1 is a sectional side elevation showing the reflector assembly.

As an example of this invention the reflector comprises a circular flat rigid metal base plate 1 adapted to be adhesively secured to a road surface by the use of an epoxy or other suitable resin.

The base plate 1 is secured in any suitable manner to an inner circular plate 2 with a rectangular central perforation 3 therethrough, the plate 2 being bonded to a rubber moulding forming the body 4 of the reflector. The body is shaped above the rectangular perforation 3 to form a bridge 5 over the length of the perforation. A passage 6 extends transversely through the body below bridge 5 and communicates with an aperture 7 extending upwardly from the bottom of the body and perforation 3.

A further rigid metal plate 8 is bonded to the undersurface of bridge 5 and the moulding is relieved internally in a manner which will permit the bridge 5 with the plate 8 to be flexed downwardly towards the aperture 7. These relived portions 9 may be covered by a suitable flexible reinforcing.

The upper edges of the aperture 7 are slightly rebated to form flexible wiping ribs 10 extending parallel to the length of bridge 5.

As shown most clearly in FIG. 1 the opposite sides of the body 4 are shaped as ramps 11 sloping upwardly to the outer ends of the passage 6 which provide sockets for housing the reflecting elements, the moulding then being stepped upwardly to bridge 5. Should it be desired to direct the reflector in one direction only then it is only necessary to have a single ramp 11 and corresponding single socket housing the reflecting elements.

As assembly comprising a rigid inverted T-shaped member 12 having glass rods 13 mounted on opposite sides thereof is provided to form the reflecting elements of the reflectors. The glass rods 13 are internally backed by strips 14 of material having fine glass beads adhering thereto. The beads and/or strips 14 are applied directly to the surface of the glass rod 13. The member 12 may be made of metal or in the form of a fibre reinforced moulding and the glass rods 13 secured thereto in any convenient manner.

The assembly of member 12, rods 13 and strips 14 is inserted into the body 4 through perforation 3 and adhesively secured to plate 8 so that the glass rods 13 are located across each opening into passage 6. A block 15 of foam rubber may then be inserted into aperture 7 and the base plate 1 secured to plate 2.

Figure 2:
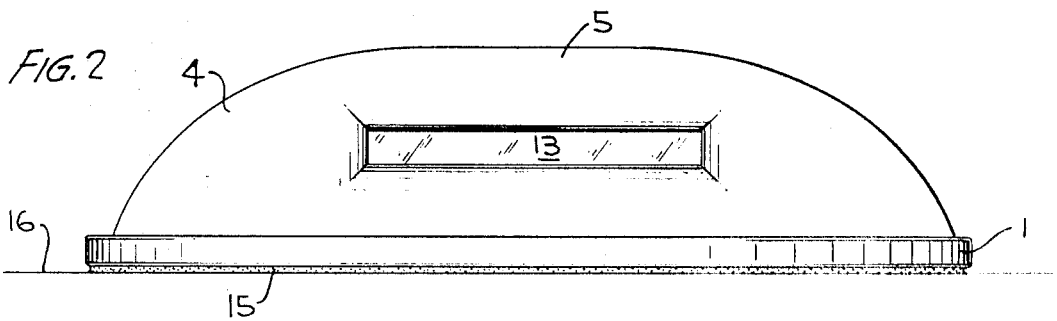
FIG. 2 is an end elevation thereof.
Figure 3:
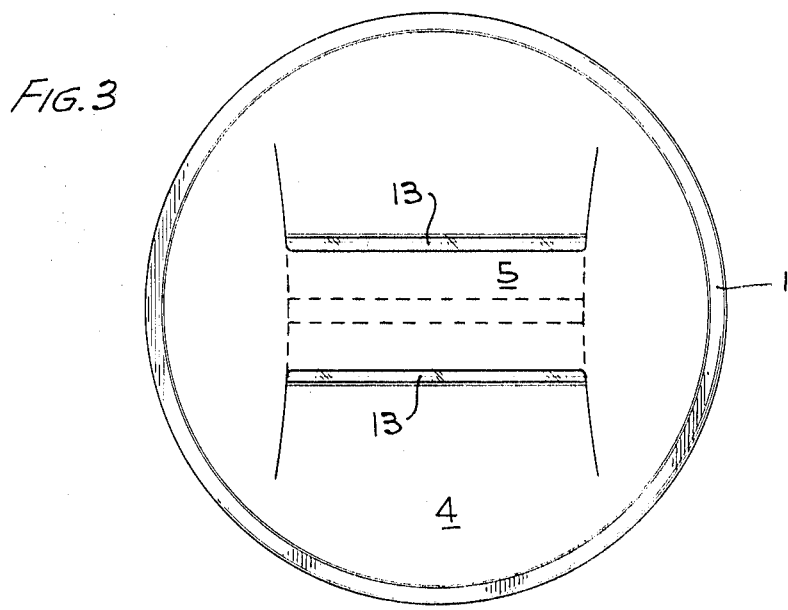
FIG. 3 is a plan thereof.

The base plate 1 is then secured directly by a layer 15 of adhesive to a road surface 16 as indicated in FIG. 2.

The tire of a vehicle passing over the reflector assembly passes over ramp 11 and depresses the bridge 5 so that the rods 13 are moved downwardly past and in contact with the wiping ribs 10 thereby cleaning the exposed surfaces of the rods 13.

The shaping of the body to form ramps 11 assists in exposure of the bridge 5 to the contact of vehicle wheels and also exposure of the outer surfaces of rods 13 to incident light.

Due to the cylindrical shape of rods 10 they are effectively cleaned and the absence of any metal box housing the moulding allows the complete assembly to be very cheaply made and installed.

The use of the foam rubber block 15 is not essential but is used merely to reduce wear on the bottom of element 12 by contact with base plate 1.

I claim:

1. A road reflector comprising a base plate having a flat bottom surface for adhesive contact with an underlying surface, a resilient body of one-piece construction secured to said base comprising an upper bridge portion projecting upwardly from the body an elongated passageway extending interiorly under the bridge portion and in parallel alignment thereto, at least one elongated external opening in the side of the body communicating with said passageway along its length, a cylindrical reflecting rod positioned in the passageway adjacent said opening, said rod having a part of its cylindrical surface projecting through said opening, an externally visible light reflecting material secured behind said rod, a lower portion below said bridge passageway with an elongated wiping rib to clean the exposed surface of said rod when said bridge is depressed.

2. A road reflector in accordance with claim 1 wherein said body has a pair of opposing external openings communicating with said passageway, and said passageway includes an inverted T-member secured to the under portion of said bridge for moving said reflecting rod in a vertical direction past said wiping rib, and a cylindrical rod in opposite sides of the upstanding leg.

3. A road reflector in accordance with claim 2 wherein said inverted T-member is adapted to move downwardly under the weight of a vehicle carrying said rods past said wiping means, said T-member returning to an upper position after the load is removed whereby said rods are positioned above said wiping elements and externally visible.